(12) United States Patent
Samuel et al.

(10) Patent No.: US 9,733,950 B2
(45) Date of Patent: Aug. 15, 2017

(54) BOOT SEQUENCING FOR MULTI BOOT DEVICES

(71) Applicant: Microchip Technology Incorporated, Chandler, AZ (US)

(72) Inventors: Roshan Samuel, Chandler, AZ (US); Rodney Pesavento, Chandler, AZ (US); Igor Wojewoda, Tempe, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 373 days.

(21) Appl. No.: 14/209,068

(22) Filed: Mar. 13, 2014

(65) Prior Publication Data

US 2014/0281466 A1 Sep. 18, 2014

Related U.S. Application Data

(60) Provisional application No. 61/784,833, filed on Mar. 14, 2013.

(51) Int. Cl.
*G06F 9/00* (2006.01)
*G06F 15/177* (2006.01)
*G06F 9/44* (2006.01)

(52) U.S. Cl.
CPC ............ *G06F 9/441* (2013.01); *G06F 9/4408* (2013.01)

(58) Field of Classification Search
CPC ...... G06F 9/4401; G06F 9/441; G06F 9/4408; G06F 8/665
See application file for complete search history.

(56) References Cited

U.S. PATENT DOCUMENTS

| 5,822,582 | A | * | 10/1998 | Doragh | G06F 9/4408 713/2 |
| 6,158,002 | A | | 12/2000 | Kwan et al. | 713/2 |
| 6,493,822 | B1 | | 12/2002 | Rafanello | 713/1 |
| 6,754,818 | B1 | * | 6/2004 | Lee | G06F 9/4406 713/1 |

(Continued)

OTHER PUBLICATIONS

International Search Report and Written Opinion, Application No. PCT/US2014/026424, 12 pages, Aug. 11, 2014.

(Continued)

*Primary Examiner* — Chun Cao
*Assistant Examiner* — Zhipeng Wang
(74) *Attorney, Agent, or Firm* — Slayden Grubert Beard PLLC (57) ABSTRACT

A multi-boot device capable of booting from a plurality of boot devices, each storing a boot image. The multi-boot device determines which boot device to load based on sequence numbers assigned to each of the boot devices. Some embodiments will make this determination using only hardware operations. The multi-boot device compares the sequence numbers of the available boot devices in order to determine the boot image to be loaded. The address of the selected boot image is then mapped to the device's default boot vector. The remaining images are likewise mapped to a secondary boot memory. The device then boots from the default boot vector. The user can change the boot device to be loaded by modifying one or more of the boot sequence numbers. The boot images can be updated without resetting the device by switching execution to and from boot images in the secondary boot memory.

20 Claims, 3 Drawing Sheets

(56) References Cited

U.S. PATENT DOCUMENTS

| | | | |
|---|---|---|---|
| 9,230,112 B1* | 1/2016 | Peterson | G06F 21/575 |
| 2004/0049668 A1 | 3/2004 | Miyamoto et al. | 713/1 |
| 2004/0260919 A1* | 12/2004 | Takahashi | G06F 9/4401 |
| | | | 713/2 |
| 2005/0182922 A1 | 8/2005 | Guo et al. | 713/1 |
| 2005/0273588 A1* | 12/2005 | Ong | G06F 11/1417 |
| | | | 713/2 |
| 2006/0085629 A1 | 4/2006 | Swanson et al. | 713/1 |
| 2008/0040598 A1* | 2/2008 | Lee | G06F 9/441 |
| | | | 713/2 |
| 2008/0148038 A1* | 6/2008 | Abe | G06F 11/073 |
| | | | 713/2 |
| 2009/0089570 A1* | 4/2009 | Andrianov | G06F 15/177 |
| | | | 713/2 |
| 2012/0191960 A1* | 7/2012 | Piwonka | G06F 9/441 |
| | | | 713/2 |
| 2012/0210115 A1* | 8/2012 | Park | H04L 9/3242 |
| | | | 713/2 |
| 2014/0237223 A1* | 8/2014 | Chudgar | G06F 9/4408 |
| | | | 713/2 |
| 2014/0281466 A1* | 9/2014 | Samuel | G06F 9/4408 |
| | | | 713/2 |

OTHER PUBLICATIONS

European Office Action, Application No. 14720356.6, 7 pages, Mar. 15, 2017.

* cited by examiner

BOOT SEQUENCING FOR MULTI BOOT DEVICES

CROSS-REFERENCE TO RELATED APPLICATIONS

This application claims the benefit of U.S. Provisional Application No. 61/784,833 filed on Mar. 14, 2013, which is incorporated herein in its entirety.

TECHNICAL FIELD

The present disclosure relates to microcontrollers and microprocessors and, particularly, boot sequencing for multi-booting embedded microcontroller systems.

BACKGROUND

Upon being powered or reset, an embedded microcontroller must select a boot device containing a boot image from which the embedded system will run. The microcontroller may support the use of more than one boot device. Multi-booting refers to the microcontroller selecting between multiple available boot devices. In order to support multi-booting, a mechanism is required that allows the microcontroller to select the desired boot device from the set of available boot devices.

Systems typically utilize a default boot vector to identify the boot device containing the boot image that is to be loaded. A default boot vector, which is sometimes referred to as a reset vector, is a designated address space that identifies the location of the boot device from which the system is presently configured to run. Upon a reboot or reset, the CPU accesses the boot vector and is directed to the location of a boot device containing a boot image, which is then loaded. Each boot image will typically include application code for operation of the embedded system and boot loader code for loading the application code. The boot loader initializes the system and loads the application code for execution by the system. In a single boot system, the sole boot image is identified by the boot vector. However, in a multi-boot system, the problem arises as to how to adapt this boot vector mechanism for selecting between multiple available boot devices.

One solution for supporting multi-booting is to change the boot vector that is utilized. This can be accomplished by inserting a jump instruction to be executed in conjunction with a reset instruction. The jump instruction directs the system to the location of a selected boot device. Another possibility is to redefine the location of the boot vector prior to the issuance of a reset command such that, upon reset, the system loads the boot image specified by this redefined boot vector. Another possibility is to circumvent the boot vector by placing the boot image at a fixed address and programming the system to boot directly from this address.

These conventional approaches require making significant changes to the system's software each time a different boot device is selected. For instance, if the location of the boot vector is changed, boot images must be recompiled in order to utilize the new boot vector. As changes to the boot images are made, the user must ensure that updated boot images are configured according to the remapped boot vector. With each change to the location of the boot vector, the user must propagate these changes to all relevant boot images. If the boot vector is circumvented entirely, not only must each boot image be recompiled to point to the address location of the boot code to be used, the device logic itself must be altered to circumvent the default boot vector and, as before, each boot image would have to be recompiled in order to reset to this new boot code location. It would be desirable to have a configurable multi-booting solution that does not require recompiling boot images each time a change to the selected boot device is made. It would be further desirable to enable the multi-booting selections to be made via a simple hardware configuration.

SUMMARY

Conventional dual-booting approaches require substantial reconfiguration in order to change the selected boot image and provide no ability to update boot images in a fail-safe manner. Hence, there is a need for configurable dual-booting solution that allows boot determinations to be made in hardware and provides for seamless updating of boot images. These and other drawbacks in the prior art are overcome in large part by a system and method according to embodiments of the present invention.

According to an embodiment, a method for booting a multi-boot device having a first boot image and a second boot image, comprising: determining a first boot sequence number associated with the first boot image; determining a second boot sequence number associated with the second boot image; identifying a selected boot image by comparing the first sequence number and the second boot sequence number wherein the comparison determines whether the first boot image or the second boot image is the selected boot image, wherein the selected boot image is identified by device hardware operations; mapping the address of the selected boot image to a primary boot memory location specified by a default boot vector; and booting the device from the default boot vector.

Further embodiments may also include: determining the first boot sequence number and determining the second boot sequence number comprises, respectively, reading the first boot sequence number from a predetermined location associated with the first boot image and reading the second boot sequence number from a predetermined location associated with the second boot image. Further embodiments may also include verifying that multi-booting of the device has been enabled. In further embodiments, the boot image not determined to be the selected boot image is a secondary boot image and may also include mapping the address of the secondary boot image to a secondary boot memory location wherein the contents of the secondary boot memory location can be updated without affecting device operations executing from the primary boot memory location. Further embodiments may also include: processing a command directing the device to swap from the selected boot image to the boot image stored in the secondary boot memory location; and switching execution of the device from the selected boot image to the boot image stored in the secondary boot memory location wherein the switch is made without resetting the device. Further embodiments may also include: setting a configuration parameter indicating whether the device is executing from the primary boot memory location or the secondary boot memory location. In further embodiments, the verification that multi-booting is enabled comprises determining whether the first boot image and the second boot image are both valid boot images.

BRIEF DESCRIPTION OF THE DRAWINGS

The present invention may be better understood, and its numerous objects, features, and advantages made apparent

DETAILED DESCRIPTION

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

As discussed above, an embedded system typically runs from a boot image where the location of the boot image in memory is identified by the default boot vector. The default boot vector specifies the boot image that is to be loaded whenever the system is booted or reset. This default boot vector may be located at any predetermined location in program memory as long as this location is uniformly known to the CPU and the boot images as the address of the first boot instruction to be executed upon a reboot or a rest.

Upon the system being booted or reset, the address specified by the default boot vector identifies the boot image to be loaded. However, unlike conventional systems, embodiments provide for the ability to change the boot image to be loaded via a simple configuration process that can be executed in hardware.

As described above, changing the location of the default boot vector is possible but requires recompiling each of the boot images to point to this new boot vector location. Instead, embodiments provide the ability to change the boot image that is to be used without having to recompile the boot images or alter the logic by which selected boot image is determined by the system. In other words, embodiments utilize a conventional default boot vector that is the first instruction executed upon any reboot or reset of the system. Embodiments provide the ability to switch boot images by re-ordering the available boot devices. Thus, a different boot device can be designated as the selected boot devices by re-ordering the boot devices in the sequence. According to embodiments, a boot device may any memory device that can be assigned to the boot vector, such as internal or external volatile memory (such as RAM), or internal or external non-volatile memory such as Flash memory, EEPROM or an SD Card.

According to embodiments, boot devices are assigned sequence numbers that specify the rank of each boot device containing a boot image among the available set of boot devices. Upon a reboot or reset, the system may use a state machine implemented in hardware to determine the relative ordering of the available boot devices based on the sequence numbers of the boot devices. Once the selected boot device has been identified, the address of the selected boot device is mapped to the default boot vector without altering the boot image. This allows the CPU to boot conventionally from the default boot vector which is redirected to the selected boot image. In this fashion, any number of boot images can be made available and selected using configurable sequence numbers where the process for selecting the desired boot image can be implemented in hardware and thus executed without the CPU having to load and execute any software.

According to some embodiments, the sequence number provided to each boot image signifies the relative order of the boot images. In one embodiment, the boot image assigned the lowest sequence number is the selected boot image, with the boot image with the next lowest sequence number being the first alternate selected boot image. In another embodiment, the boot image that is provided the highest sequence number is the selected boot image.

In some embodiments, the sequence number for each boot device is stored in a predetermined location of that boot image such that each boot device provides a standardized mechanisms for identifying the sequence number of the boot device. In this manner, the user is able to assign a sequence number to each boot device such that the sequence number is stored as part of the boot image. Each available boot device can then be queried in order to ascertain its assigned sequence number. In another embodiment, the boot device sequence numbers are stored a data structure present in memory. This data structure can be queried in order to determine the available boot devices and the sequence number for each boot device. In another embodiment, sequence numbers are stored external to the boot devices such that each sequence number is stored in a memory location that is associated with a boot device.

After the reset, the sequence numbers are utilized to identify the selected boot device. In some embodiments, a state machine is utilized to read the sequence numbers for all available boot devices and to determine the boot device with the lowest (or highest) sequence number. In this manner, the state machine identifies the selected boot device.

According to embodiments, once the relative ordering of the sequence numbers has been used to identify the selected boot device, the address of the selected boot device is mapped to the boot memory specified by the default boot vector. The selected boot image will thus become the default boot image that is loaded on a subsequent reboots or resets and will remain the default boot image until the sequence numbers of the available boot images are altered to indicate that a different boot image has been selected. Also according to embodiments, the address of the boot image with the second ranked sequence number is mapped to a secondary boot memory location. As described below, embodiments provide the ability for users to trigger swapping execution between the boot memory and the secondary boot memory. This provides the opportunity for the device to switch execution to the secondary boot memory while updating the boot image in the boot memory. This allows fail-safe updating of boot images and also allows updates to be made without resetting the device.

The CPU then proceeds to execute from the selected boot device. According to some embodiments, sequence numbers of boot devices may be changed via software instructions within the application code where these changes either increment or decrement the sequence number of one or more boot devices. After a boot or reset of the device, the updated sequence numbers are used in determining the relative ordering of the boot devices. In this manner, the user can change the selected boot image without having to recompile any software or alter the booting logic of the device. Consequently, the selected boot image can be determined in hardware by ordering the valid sequence numbers of available boot images.

Each boot memory location is a region in memory that contains a boot image, which is a set of booting instructions and application code from which the CPU can run. However, a region in memory corresponding to a boot memory location may also be blank. This allows the ability to reserve a region in memory, but has the effect of establishing an invalid boot image. The device can then update these invalid boot images while executing from a valid boot image.

In another embodiment explained in further detail below, a user may "hot swap" from one boot image to another without having to reset the device. For example, while executing the application code loaded by a first boot image, the user can trigger an immediate swap to the execution of a second boot image. This provides the ability to swap from the previously selected boot image loaded in boot memory with the boot image loaded in the secondary boot memory, as long as the trigger remains in effect. In some embodiments, this temporary boot image swap can be adopted for use in subsequent resets by adjusting the boot sequence numbers of the boot images. Upon the next reset, the boot images will be remapped accordingly.

Figure 1:
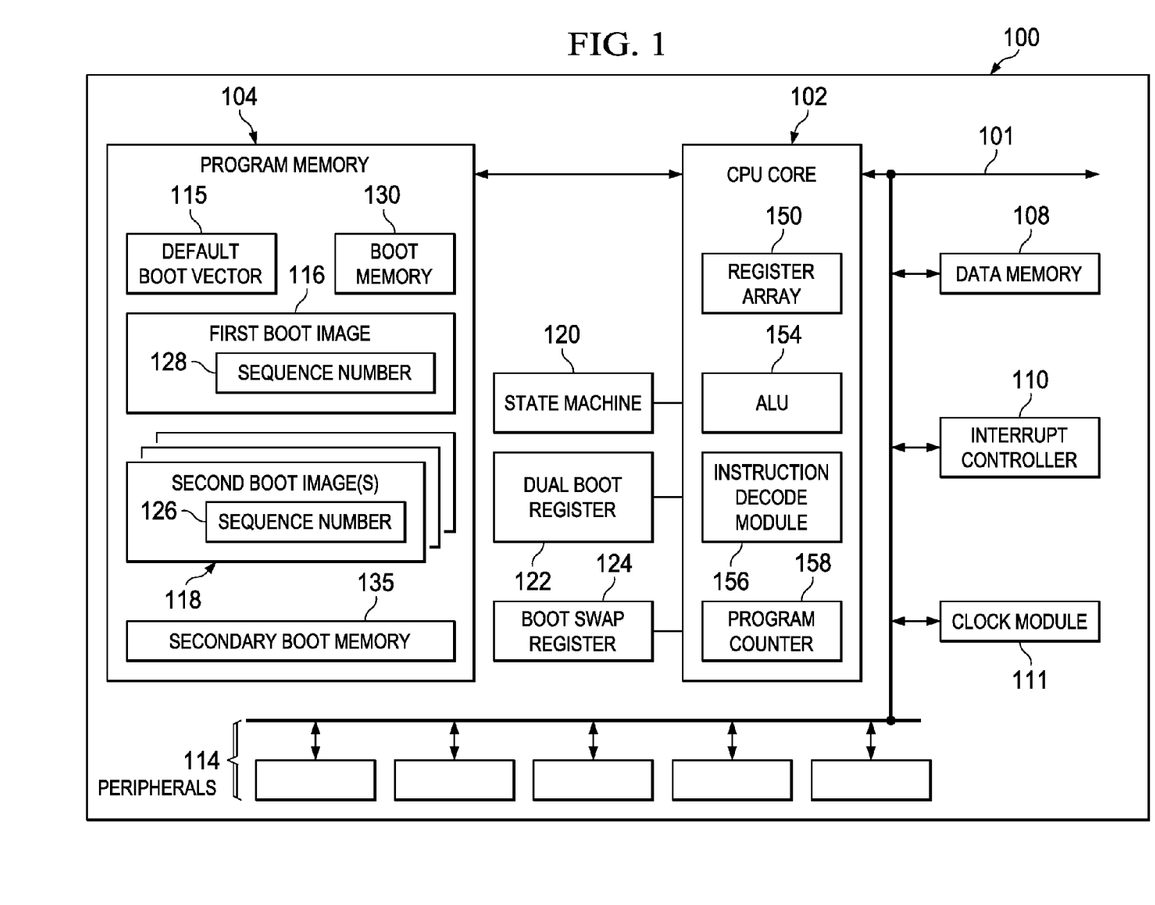
FIG. 1 is a block diagram of an exemplary processor according to embodiments.

Turning now FIG. 1, a block diagram of an exemplary microcontroller 100 that implements a multi-boot system in accordance with embodiments is shown. It is noted that other configurations of the microcontroller are possible. Thus, FIG. 1 is an exemplary embodiment. The microcontroller 100 includes a bus 101 and a central processing unit (CPU) core 102 coupled to the bus 101. The CPU core 102 may include one or more register arrays 150, an arithmetic logic unit 154, an instruction decode module 156 and a program counter 158. Upon being booted or reset, the CPU core 102 is configured to read its first instruction from the default boot vector 115 stored in program memory.

In the embodiment illustrated in FIG. 1, data memory 108 communicates with the CPU core 102 via the bus 101. The bus 101 also provides the CPU core 102 with access to microcontroller services such as interrupt controllers 110 and clock module 111. The CPU core 102 can also access one or more peripheral components 114 via the bus 101. These peripheral components may be implemented entirely by the microcontroller or may be implemented in some part external to the microcontroller. The peripherals 114 available to the microcontroller may implement, for example, timing support, I/O (input/output) interfaces, PWM (pulse width modulation) and USB functionality.

The CPU core 101 also communicates with program memory 104. In some embodiments one or more boot images 116, 118 are stored in program memory 104. Other embodiments may allow for boot images to be stored in a separate, dedicated memory. The boot images are comprised of a first boot image 116 and one or more second boot images 118. As described below, embodiments allow the microcontroller 100 to selectively boot based on either the first boot images 116 or one of the second boot images 118. As described above, some embodiments may refer to boot memory locations, regions or devices rather than boot images. Thus, in some embodiments, first boot image 116 and second boot image 118 may be represented as regions in memory that are boot memory locations with no guarantee that the region contains a valid boot image.

According to the embodiment of FIG. 1, a default boot vector 115 is located in program memory 104. The CPU core 102 is configured to read its first instruction from the default boot vector 115. Some embodiments may allow for the boot vector 115 to be located in other non-volatile or volatile memory. The default boot vector 115 may be located anywhere in the program memory as long as the CPU core 102 has been configured to access the default boot vector 115 upon a boot or reset. The default boot vector 115 specifies the location in memory of the boot image to be loaded, which is referred to as the boot memory 130. Thus, upon a boot or reset the CPU core 102 accesses the default boot vector 115 and is directed to the address of the boot memory 130 which has been mapped to the address of the selected boot device which stores the selected boot image.

The device may also retain other boot images in program memory via a secondary boot memory 135. Based on the ordering of the boot images by sequence numbers, the selected boot image is identified and its address is mapped to the boot memory 130. The second ranked boot image is the first alternate boot image and its address mapped to secondary boot memory 135. The user can then trigger switching execution from the boot memory 130 and the secondary boot memory 135 as needed in order to update these boot images in a fail-safe manner.

In some embodiments, the boot images 116, 118 include predetermined locations for storing boot sequence numbers. As illustrated in FIG. 1, the first boot image is comprised of a boot sequence number 128 which is used to determine the relative ordering of the first boot image versus other available boot images that have been assigned a boot sequence number. In this same manner, the second boot image is also comprised of a boot sequence number 126 that specifies the relative order of the second boot image within the set of available boot images.

In order to facilitate determination of the relative ordering of the available boot images, the boot sequence number of each boot image is determined in a standardized manner. In some embodiments, the boot sequence number will be stored in a predetermined location within the boot image. For example, the boot sequence number of each boot image may be located at a memory address that is located at a fixed offset from the first instruction of the boot image. In some embodiments, the memory address at which the boot sequence number is stored within a boot image may be available as a variable that can be queried at a predetermined location within the boot image. In some embodiments, the boot sequence numbers that have been assigned are stored in a data structure. In this scenario, the relative ordering of the available boot images can be ascertained by querying this data structure to obtain the sequence number for each boot image. In some embodiments, the boot sequence numbers will be stored in non-volatile memory external to the boot image.

Every available boot image can be assigned a boot sequence number. However, embodiments may only assign a subset of the available boot images a sequence number. In such scenarios, boot images with no sequence numbers would be ordered behind all boot images with an assigned sequence number. In some embodiments, some of the available boot devices may be invalid and thus cannot be ordered in this fashion. For these invalid boot devices, querying their sequence number returns an error. These invalid boot images would not be mapped to any boot memory and thus do not exist as booting options with multi-boot device.

FIG. 1 also illustrates a boot panel comprised of special-purpose configuration registers that are used to direct the booting process in some embodiments. One such register is a dual boot control register 122 that can be used to configure whether the microcontroller 100 is to execute dual booting processes. As explained in more detail below, if the value of the dual boot register 122 does not enable dual booting, the device will proceed to boot the microcontroller as a single boot device. The configuration registers may also comprise a boot swap register 124 that is used to identify the boot image that is presently loaded and to command the device to conduct a hot swap to a specified boot image, for example the boot image in the secondary boot memory. Additional configuration registers may be present that further direct the boot sequencing process.

Figure 2:
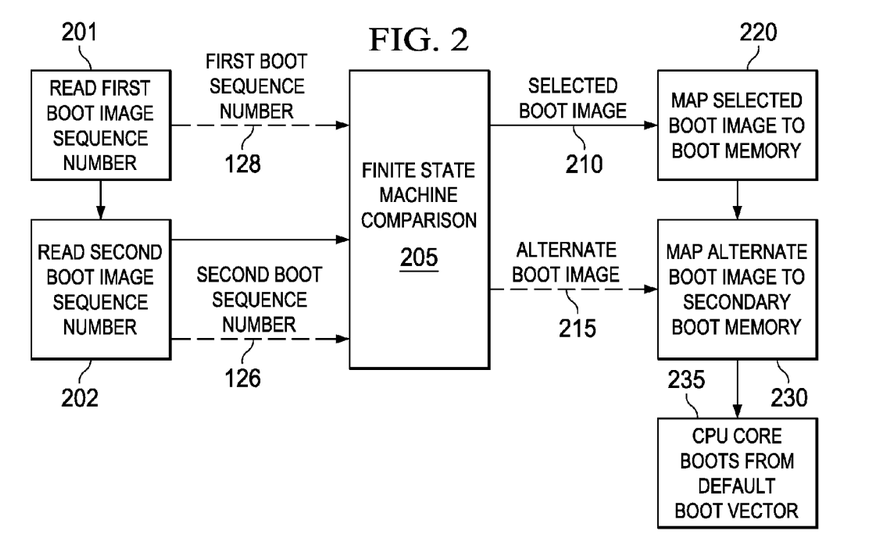
FIG. 2 schematically illustrates operation of embodiments.

FIG. 2 schematically illustrates a process for utilizing boot sequence numbers in accordance with embodiments. Upon being booted or reset, the device reads the sequence numbers for the two available boot images 116, 118. At step 201, the boot sequence number 126 for the first boot image 116 is determined. At step 202, the boot sequence number 128 for the second boot image is determined. At step 205, the device then compares the first boot image sequence number 128 and the second boot image sequence number 126. Based on this comparison, the selected boot image 210 and the first alternate boot image 215 are identified. At step 220, the address of the boot device storing the selected boot image 210 is mapped to the boot memory location 130. At step 230, the address of the first alternate boot image 215 is mapped to the secondary boot memory location 135. In some embodiments, the address of the remaining valid boot images are mapped, in order, to the secondary boot memory. At step, 235, the CPU core then boots conventionally, by accessing the default boot vector and being redirected to the address of the boot device storing the selected boot image. The CPU core proceeds to boot from the selected boot image.

The selected boot image can be identified, according to some embodiments, utilizing a finite state machine 120. Using a finite state machine for identifying the selected boot image facilitates embodiments that implement configurable dual booting in hardware. The finite state machine 120 is used to make pair-wise comparisons of boot sequence numbers in order to determine their relative ordering. In FIG. 2, a finite state machine 120 is used to determine the relative ordering of the boot sequence numbers of a first boot image 116 and a second boot image 118. At steps 201 and 202, the boot sequence numbers for each of the boot images is determined. As described above, according to some embodiments, the boot sequence number of each boot image may be stored at a predetermined address location of the boot image. Other embodiments may allow for the boot sequence numbers to be stored in other fixed locations or data structures in memory. At step 205, the finite state machine then compares the boot sequence number of the first boot image 128 and the boot sequence number of the second boot image 126.

In the example of FIG. 2, the relative ordering of only two boot images is illustrated. It is noted, however, that the finite state machine 120 can be used to determine the relative ordering of any number of boot images. The finite state machine 120 compares the boot sequence numbers of two boot images at one time. However, according to algorithms known in the art, a series of pair-wise comparisons can be made in order to determine the relative ordering of the boot sequence numbers for any number of boot images.

Figure 3:
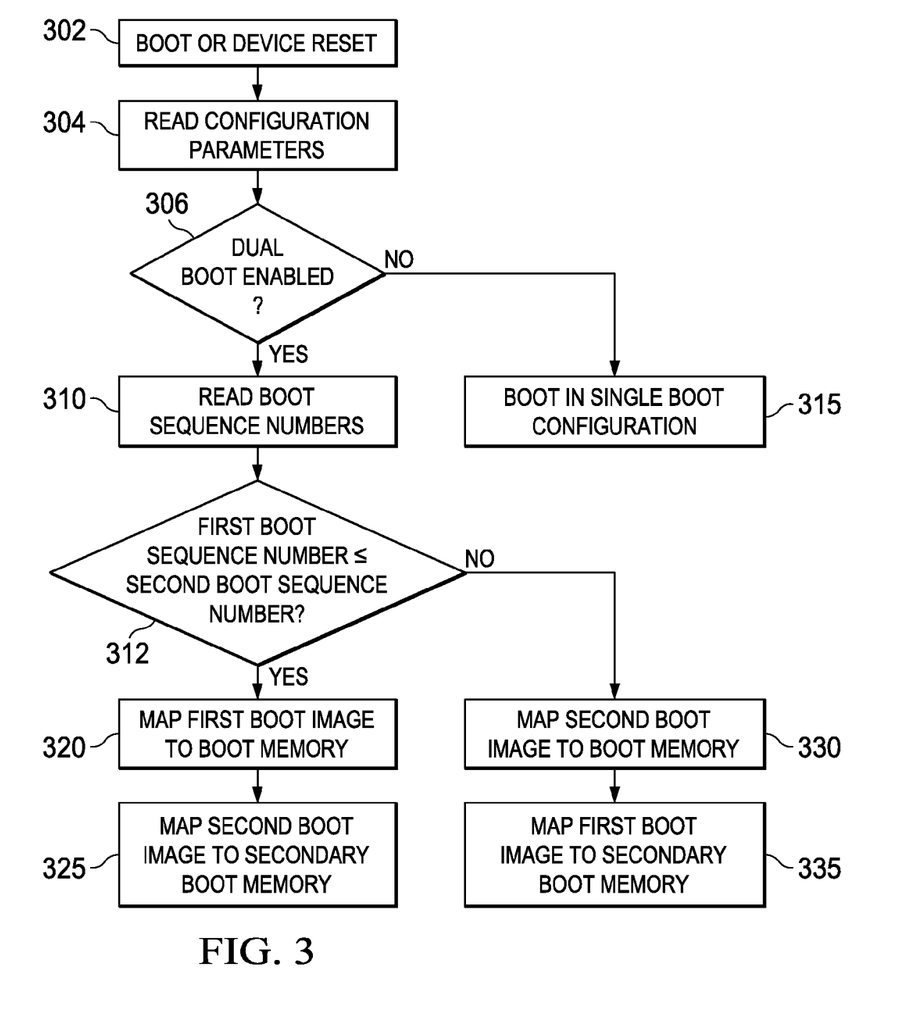
FIG. 3 is a flowchart illustrating operation of embodiments.

In the embodiment of FIG. 3, the device makes a preliminary determination whether to proceed with dual-booting based on whether dual booting has been requested or whether multiple boot images are available for booting. At step 302, the device undergoes a boot or a reset. At step 304, reads the configuration data necessary to determine whether to proceed with dual booting. In one embodiment, the boot configuration panel is accessed in order to read configuration bits that encode dual booting instructions. In some embodiments, these configuration bits will be located in dual boot register 122. Other embodiments may instead store these configuration bits in fixed locations in program memory. In some embodiments, dual booting is determined based on whether multiple valid boot images can be identified. Thus, in step 304, the CPU core accesses the boot sequence numbers for every available boot image.

At step 306, the device determines whether dual booting has been enabled. If configuration bits are used, embodiments will determine whether these bits enable dual booting. If dual booting is based on valid boot sequence numbers, embodiments will evaluate the boot sequence numbers that have been identified to determine if two or more valid boot images are available. If only one valid boot image is identified or the configuration bits specify that dual booting is not enabled, the device boots in a single boot configuration at step 315 by booting from the default boot vector. If no valid boot image is identified, the CPU core boots from the boot image specified by the default boot vector, which will be the boot image that was last known to be valid.

If step 306 determines that dual boot is enabled, then the selected boot image is determined as described with respect to the embodiment of FIG. 2. At step 310, the boot sequence numbers of the first boot image 116 and the second boot image 118 are determined. Based on the boot sequence number comparison made at step 312, either the first boot image 116 or the second boot image 118 is determined to be the selected boot image. If the boot sequence number of the first boot image 116 is the lowest boot sequence number or equal to the lowest sequence number, at step 320, the address of the first boot image is mapped to the boot memory and, at step, 325, the address of the second boot image is mapped to secondary boot memory. Conversely, if the boot sequence number of the second boot image 118 is the lowest boot sequence number, at step 330, the address of the second boot image is mapped to the boot memory and, at step, 335, the address of the first boot image is mapped to secondary boot memory.

Figure 4:
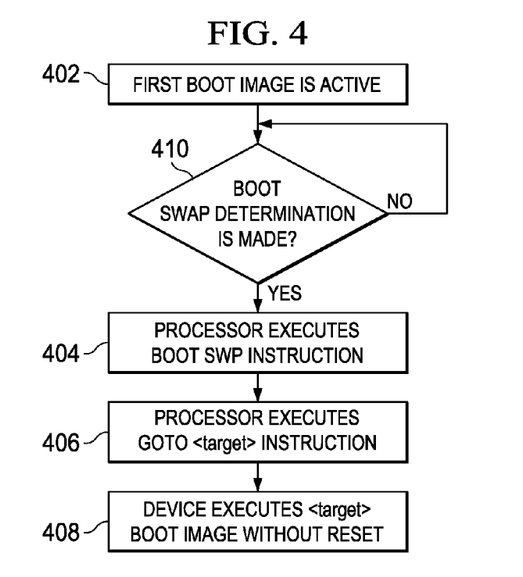
FIG. 4 is a flowchart illustrating operation of embodiments.

The process by which a boot image hot swap is conducted is shown in FIG. 4. At a process step 402, the device is executing according to a first boot image 116. At this point, the boot swap register 124 signals that a hot swap is not presently in effect. At step 410, the boot swap register 124 is used to determine whether a boot swap is to be undertaken. In some embodiments, the boot swap register 124 may encode a value directing that a boot swap be undertaken. For example, a zero entry in the boot swap register may indicate that the current boot image should be maintained and a one entry may indicate that the current boot image should be swapped. Another possibility is for the boot swap register 124 to encode the device number of the boot device that is presently loaded. As long as the boot swap register 124 contains the device number corresponding to the currently executing boot image, no swap is made. If the boot swap register 124 is changed to point to a different device number, this signals that a boot swap should be undertaken. Yet another possibility, is for boot swaps to be specified in software via a bootswap instruction. This embodiment is the focus of the remaining elements of FIG. 4. If boot swap register 124 indicates that no boot swap is presently requested, the device continues to monitor the boot swap register until any such indication is identified.

In process step 404, it is determined that the user has directed the device to enact a hot swap of boot images. In the embodiment of FIG. 4, the user will trigger a hot swap of boot images by issuing a BOOTSWP instruction that is followed by a GOTO <target> instruction where the <target> specifies the boot image to be hot swapped. For instance, the <target> would specific the second boot image 118 as the boot image to be swapped in place of the active boot image. At step 404, the CPU core 102 executes the BOOTSWP instruction and interrupts the execution of the current active first boot image 116.

At process step 406, the CPU core 102 executes the GOTO instruction and jumps directly to the <target> boot image, for example the second boot image 118. Upon executing this jump, the CPU core 102 begins executing the second boot image 118. This results in a hot swap from the first boot image 116 to the second boot image 118 with no reset of the device and no changes to the exiting device configuration. At process step 408, the configuration data is updated to reflect that active boot image has been hot swapped. For instance, boot swap register 124 would be updated to indicate that no hot swap is presently requested or specify the address of the boot image that is presently executing.

A hot swap of boot images, by itself, does not alter the boot image that is mapped to boot memory and thus does not change the boot image that will be loaded upon a reset of the device. Thus, even though the second boot image 118 may have been hot swapped in place of the first boot image 116, if the first boot image 116 is still mapped to boot memory and the device will load the first boot image 116 upon a subsequent boot or rest. Unless modifications are made to the boot sequence numbers of the boot images, a hot swap will constitute a temporary swap that lasts only until the device is reset. A hot swap of boot images can be made into permanent swap via the previously described process of updating boot sequence numbers. For example, if the user has hot swapped to the second boot image 118, the swap can be made permanent by re-assigning boot sequence numbers of the available boot images such that the second boot image 118 has the lowest boot sequence number which results in the second boot image 118 being mapped to the default boot vector 115.

One advantage provided by embodiments is fail-safe mechanism for updating boot images. If the presently active boot image that is executing receives an update, embodiments provide a fail-safe method for making this update. For instance, the updated boot image can be stored to the secondary boot memory. One the updated boot image has been verified, the sequence numbers can be updated for the executing boot image and the updated boot image, as described above, such that the updated boot image now has the lowest/highest sequence number such that it will be determined to be the selected boot image on the next boot or reset. If a power failure were to occur at any time during the update such that the updated boot image is corrupted, the device can continue operating from the currently executing boot image. If the power failure occurs after the updated boot image is verified but during the sequence number update, either the updated sequence number is valid such that the new boot image is correctly identified as the selected boot image or the sequence number is invalid such that the currently executing boot code is loaded based on it still being located in boot memory and identified by the default boot vector.

Although the foregoing specification describes specific embodiments, numerous changes in the details of the embodiments disclosed herein and additional embodiments will be apparent to, and may be made by, persons of ordinary skill in the art having reference to this description. In this context, the specification and figures are to be regarded in an illustrative rather than a restrictive sense, and all such modifications are intended to be included within the scope of this disclosure. Accordingly, the scope of the present disclosure should be determined by the following claims and their legal equivalents.

What is claimed is:

1. A method for booting a multi-boot device having a first boot image and a second boot image, wherein the multi-boot device is a microcontroller comprising a central processing unit, wherein the central processing unit is coupled with program memory storing the first and second boot image, the method comprising:
    determining a first boot sequence number associated with the first boot image and stored within the program memory;
    determining a second boot sequence number associated with the second boot image and stored within the program memory;
    identifying a selected boot image by comparing the first sequence number and the second boot sequence number wherein the comparison determines whether the first boot image or the second boot image is the selected boot image, wherein the selected boot image is identified by device hardware operations;
    mapping the address of the selected boot image to a primary boot memory within the program memory specified by a default boot vector; and
    booting the device from the default boot vector;
    wherein the boot image not determined to be the selected boot image is a secondary boot image and the method further comprises:
        mapping the address of the secondary boot image to a secondary boot memory location wherein the contents of the secondary boot memory location can be updated without affecting device operations executing from the primary boot memory location;
processing a command directing the device to swap from the selected boot image to the boot image stored in the secondary boot memory location; and
wherein the command comprises a dedicated instruction followed by a jump instruction.

2. A method in accordance with claim 1, wherein determining the first boot sequence number and determining the second boot sequence number comprises, respectively, reading the first boot sequence number from a predetermined location within the first boot image and reading the second boot sequence number from a predetermined location within the second boot image.

3. A method in accordance with claim 1, the method further comprising:
verifying that multi-booting of the device has been enabled by reading an associated special function register within the device.

4. A method in accordance with claim 1, the method further comprising
switching execution of the device from the selected boot image to the boot image stored in the secondary boot memory location wherein the switch is made without resetting the device.

5. A method in accordance with claim 4, the method further comprising:
setting a configuration parameter within a special function register of the microcontroller indicating whether the device is executing from the primary boot memory location or the secondary boot memory location.

6. A method in accordance with claim 3, wherein verification that multi-booting is enabled comprises determining that the first boot image and the second boot image are both valid boot images.

7. A multi-boot microcontroller comprising a central processing unit configured to execute instructions from a program memory storing a first boot image and a second boot image,
wherein the program memory comprises memory storage for a first boot sequence number associated with a first boot image;
wherein the program memory comprises memory storage for a second boot sequence number associated with a second boot image;
wherein the microcontroller further comprises a state machine operable to identify after a reset a selected boot image by comparing the first sequence number and the second boot sequence number wherein the comparison determines whether the first boot image or the second boot image is the selected boot image;
wherein the program memory further comprises a primary boot image memory storage location within the program memory, wherein the address of the selected boot image is mapped to the primary boot image memory storage;
wherein the microcontroller comprises a default boot vector, wherein the default boot vector is accessed by the central processing unit upon being booted or reset and wherein the boot vector specifies the location in memory of the primary boot image memory storage to which the primary boot image is mapped;
wherein:
the boot image not determined to be the selected boot image is a secondary boot image the microcontroller further comprising:
a secondary boot memory storage location for storing the secondary boot image being mapped to a secondary boot memory storage, wherein the contents of the secondary boot memory location can be updated without affecting device operations executing from the primary boot memory;
the microcontroller is configured to process a command directing a swap from the selected boot image to the boot image stored in the secondary boot memory; and
the command comprises a dedicated instruction followed by a jump instruction.

8. A multi-boot microcontroller in accordance with claim 7, wherein the first boot sequence number is stored at a predetermined location within the first boot image and the second boot sequence number is stored at a predetermined location within the second boot image.

9. A multi-boot microcontroller in accordance with claim 7, wherein execution of the device is switched from the selected boot image to the boot image stored in the secondary boot memory without resetting the device.

10. A multi-boot microcontroller in accordance with claim 9, the device further comprising:
memory storage for a configuration parameter wherein the parameter indicates whether the device is executing from the primary boot memory or the secondary boot memory.

11. A multi-boot microcontroller in accordance with claim 7 wherein the device determines if multi-booting is enabled by determining that the first boot image and the second boot image are both valid boot images.

12. A multi-boot microcontroller configured to boot from one of a plurality boot images, the microcontroller comprising:
a central processing unit;
program memory storing a first boot sequence number associated with the first boot image and a second boot sequence number associated with the second boot image;
a state machine operable to identify a selected boot image by comparing the first sequence number and the second boot sequence number wherein a comparison determines whether the first boot image or the second boot image is the selected boot image;
a primary boot image memory storage location within the program memory, wherein the address of the selected boot image is mapped to the primary boot image memory storage; and
memory storage for a default boot vector within the program memory, wherein the default boot vector is accessed by the system upon being booted or reset and wherein the boot vector specifies the location in memory of the primary boot image;
wherein the boot image not determined to be the selected boot image is a secondary boot image the system further comprising:
a secondary boot memory storage location within the program memory for storing the secondary boot image, wherein the contents of the secondary boot memory location can be updated without affecting operations executing from the primary boot memory location;
wherein the system is configured to process a command through the central processing unit directing a swap from the selected boot image to the boot image stored in the secondary boot memory location; and wherein the command comprises a dedicated instruction followed by jump instruction.

13. A multi-boot system in accordance with claim 12, wherein the first boot sequence number is stored at a predetermined location associate with the first boot image and the second boot sequence number is stored at a predetermined location associated with the second boot image.

14. A multi-boot system in accordance with claim 12, wherein execution is switched from the selected boot image to the boot image stored in the secondary boot memory location without resetting the system.

15. A multi-boot system in accordance with claim 14, the device further comprising:
  memory storage for a configuration parameter wherein the parameter indicates whether execution is from the primary boot memory location or the secondary boot memory location.

16. A multi-boot microcontroller in accordance with claim 7, wherein the program memory within the microcontroller.

17. A multi-boot microcontroller in accordance with claim 7, wherein the program memory is partially internal and partially external to the microcontroller.

18. A method in accordance with claim 1, wherein the program memory is within the microcontroller.

19. A method in accordance with claim 1, wherein the program memory is partially internal and partially external to the microcontroller.

20. A method in accordance with claim 1, wherein a subset of available boot images are assigned a boot sequence number.

* * * * *